US008085417B2

(12) United States Patent  (10) Patent No.: US 8,085,417 B2
Funamizu  (45) Date of Patent: Dec. 27, 2011

(54) MULTIFUNCTION PERIPHERAL UNIT THAT EXECUTES A SELECTED PROCESSING FUNCTION USING TWO SELECTED DEVICES

(75) Inventor: Toru Funamizu, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1119 days.

(21) Appl. No.: 11/685,669

(22) Filed: Mar. 13, 2007

(65) Prior Publication Data

US 2007/0216943 A1  Sep. 20, 2007

(30) Foreign Application Priority Data

Mar. 14, 2006 (JP) .................................. 2006-068804
Mar. 22, 2006 (JP) .................................. 2006-078610

(51) Int. Cl.
*G06F 3/12* (2006.01)

(52) U.S. Cl. ....................................................... 358/1.15
(58) Field of Classification Search .................. 358/1.15
See application file for complete search history.

(56) References Cited

U.S. PATENT DOCUMENTS

| | | | |
|---|---|---|---|
| 5,455,688 A | 10/1995 | Furukawa et al. | |
| 6,609,162 B1 | 8/2003 | Shimizu et al. | 710/15 |
| 7,002,702 B1 | 2/2006 | Machida | 358/1.15 |
| 7,068,386 B2 | 6/2006 | Kawanabe | |
| 7,391,743 B2 | 6/2008 | Momozono et al. | |
| 7,545,525 B2 | 6/2009 | Idehara | |
| 2004/0153530 A1 | 8/2004 | Machida | 709/177 |
| 2004/0205172 A1 | 10/2004 | Kim | |
| 2004/0210897 A1* | 10/2004 | Brockway et al. | 717/174 |
| 2005/0105129 A1* | 5/2005 | Takahashi | 358/1.15 |
| 2005/0286080 A1* | 12/2005 | Lee et al. | 358/1.15 |

FOREIGN PATENT DOCUMENTS

| | | |
|---|---|---|
| EP | 1193912 A2 | 4/2002 |
| JP | 01288950 A | 11/1989 |
| JP | 07-302032 | 11/1995 |
| JP | 10320344 A | 12/1998 |
| JP | 11003220 A | 1/1999 |

(Continued)

OTHER PUBLICATIONS

European Partial Search Report for corresponding European application No. 07005151.1-1244 lists the references above.

*Primary Examiner* — Benny Tieu
*Assistant Examiner* — Qian Yang
(74) *Attorney, Agent, or Firm* — DLA Piper LLP (US)

(57) ABSTRACT

The present invention provides a multifunction peripheral unit, including a list transmission section that creates a list of devices connected to a network and transmits the list to a user terminal; a device information reception section that receives information on a device selected by the user from a user terminal constituting the transmission destination of the list; a processing function list transmission section that creates a list of the processing functions that can be executed by the device on the basis of the received device information and transmits the list of the processing functions to the user terminal; a processing function information reception section that receives information on a processing function selected by the user from a user terminal constituting the transmission destination of the processing function list; and an execution control section that controls the device to execute the processing function on the basis of the received device information and processing function information.

6 Claims, 16 Drawing Sheets

FOREIGN PATENT DOCUMENTS

| | | |
|---|---|---|
| JP | 2000-187573 | 7/2000 |
| JP | 2000-315131 | 11/2000 |
| JP | 2000-315181 | 11/2000 |
| JP | 2001326766 A | 11/2001 |
| JP | 2002007011 A | 1/2002 |
| JP | 2003285513 A | 10/2003 |
| JP | 2004-153639 | 5/2004 |
| JP | 2005119119 A | 5/2005 |
| JP | 2005176279 A | 6/2005 |
| JP | 2006067408 A | 3/2006 |
| JP | 2007-206979 | 8/2007 |
| WO | 0177853 A1 | 10/2001 |

* cited by examiner

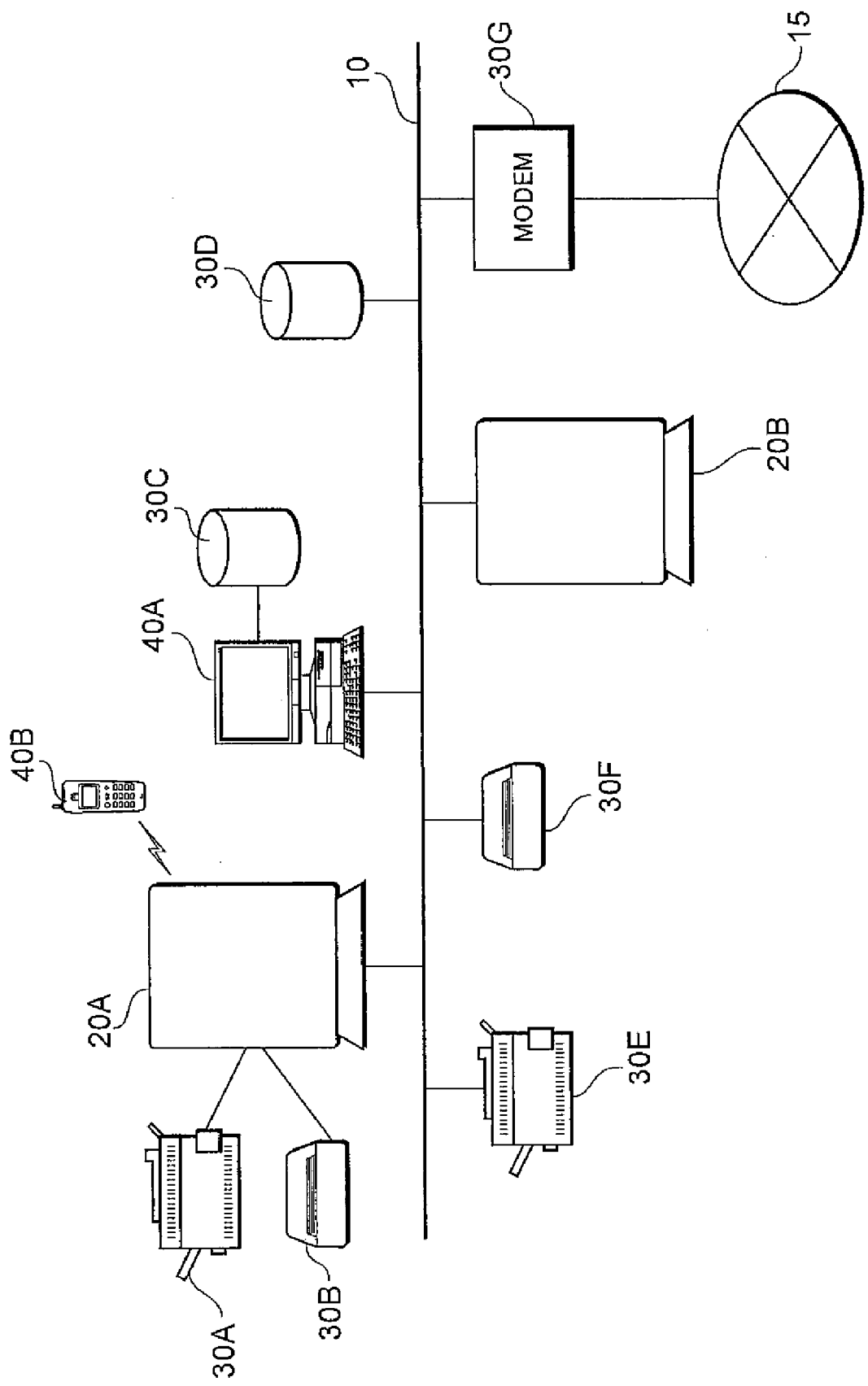

FIG.4

| | Device-Specific Information | | | Reference Information | | |
|---|---|---|---|---|---|---|
| | Product Name | Product Serial Number | Manufacturing Date | Version Number | General Term | Location | Group |

| | Product Name | Product Serial Number | Manufacturing Date | Version Number | General Term | Location | Group |
|---|---|---|---|---|---|---|---|
| 30A | LP1400 | ABC1234 | 2004.11.30 | 1.21 | MONOCHROME PRINTER | ROOM 1 | A |
| 30B | GT700 | DEF5678 | 2005.9.1 | 1.0 | SCANNER 1 | ROOM 1 | A |
| 30C | SD-40 | HI98765 | 2004.12.1 | 2.0 | 40G HDD | LOCAL PC | A |
| 30D | SD-60 | JK43210 | 2001.3.20 | 2.1 | 60G HDD | P DRIVE | A,B |
| 30E | LP3000 | LMN3333 | 2006.1.15 | 1.0 | COLOR PRINTER | COMMON SPACE | A,B |
| 30F | GT800 | OPQ7777 | 2003.7.7 | 1.2 | SCANNER 2 | CONFERENCE ROOM | A,B |
| 30G | FA12 | RST1357 | 2004.4.1 | 1.0 | FAX MODEM | ROOM 2 | A |

FIG.5

| PRODUCT NAME | PRODUCT SERIAL NUMBER | MANUFACTURING DATE | DRIVER INFORMATION |
|---|---|---|---|
| GT 700 | DEF **** | 2005.9 | http://www.eps.jp/mfpunit/gt7.exe |
| GT 800 | OPO **** | 2003.5 | http://www.eps.jp/mfpunit/gt80.exe |
| | OPP **** | 2003.6 | http://www.eps.jp/mfpunit/gt81.exe |
| | OPQ **** | 2003.7 | http://www.eps.jp/mfpunit/gt82.exe |
| GT 900 | UVW **** | 2004.3 | http://www.eps.jp/mfpunit/gt90.exe |
| ... | ... | ... | ... |

```
LIST OF AVAILABLE DEVICES

○ SCANNERS
   • SCANNER 1 (GT700, ROOM 1)
   • SCANNER 2 (GT800, CONFERENCE ROOM)

○ PRINTERS
   • MONOCHROME PRINTER (LP1400, ROOM 1)
   • COLOR PRINTER (LP3000, COMMON SPACE)

○ HDD
   • (SD-40, LOCAL PC)
   • (SD-60, P DRIVE)

○ FAX MODEMS
   • FAX MODEM (FA12, ROOM2)
```

```
USED DEVICES:
     SCANNER 1 (GT700, ROOM1)

○ LIST OF PROCESSING FUNCTIONS
   • COPY
   • IMAGE CAPTURE
   • FAX TRANSMISSION
```

```
USED DEVICES:
    SCANNER 1 (GT700, ROOM1)

O PROCESSING FUNCTION:
   • COPY

O LIST OF OUTPUT DEVICES (PRINTER)
   • MONOCHROME PRINTER (LP1400, ROOM 1)
   • COLOR PRINTER (LP3000, COMMON SPACE)
```

| GROUP | DEVICE-SPECIFIC INFORMATION | | | |
|---|---|---|---|---|
| | PRODUCT NAME | PRODUCT SERIAL NUMBER | MANUFACTURING DATE | VERSION NUMBER |
| A | LP-1400 | ABC 1234567 | 2004.11.30 | 1.21 |
| A | GT-X750 | DEF 9876543 | 2005.9.1 | 1.0 |
| B | GT-F520 | XYZ 3333333 | 2004.12.1 | 2.0 |
| ..... | ..... | ..... | ..... | ..... |

FIG.15

| PRODUCT NAME | PRODUCT SERIAL NUMBER | MANUFACTURING DATE | DRIVER |
|---|---|---|---|
| GT-800 | HIJ ******* | 2005.5 | gt8.exe |
| GT-X750 | DEF ******* | 2005.9 | gt7.exe |
| GT-F520 | VWX ******* | 2005.11 | gt51.exe |
| | XYZ ******* | 2005.12 | gt52.exe |
| ⋮ | ⋮ | ⋮ | ⋮ |

61 — PRODUCT NAME
62 — PRODUCT SERIAL NUMBER
64 — MANUFACTURING DATE
63 — DRIVER

25

MULTIFUNCTION PERIPHERAL UNIT THAT EXECUTES A SELECTED PROCESSING FUNCTION USING TWO SELECTED DEVICES

CROSS-REFERENCES TO RELATED APPLICATIONS

The entire disclosure of Japanese Patent Application No. 2006-68804, filed on Mar. 14, 2006, No. 2006-78610, filed on Mar. 22, 2006, and No. 2006-25020, filed on Feb. 1, 2006, are expressly incorporated by reference herein.

BACKGROUND

1. Technical Field

The present invention relates to a user interface technology that selects the processing functions of a multifunction peripheral.

2. Related Art

Heretofor, multifunction systems (known as 'MFP systems' hereinbelow) in which an image input device such as a scanner or digital camera and an image output device such as a printer or facsimile are connected via a network and which are able to implement a plurality of functions by means of a combination of image input devices and image output devices have been implemented.

As an MFP system of this type, JP-A-2000-187573 mentions an MFP system which, with the object of allowing executable functions to be easily grasped and the desired functions to be easily configured, is adapted to be capable of creating transfer path information indicating all the functions that can be implemented by a combination of the image input devices and image output devices that are currently connected to the network and of displaying the transfer path information on the display screen of the respective image input devices and image output devices.

Further, JP-A-2004-153639 describes the fact that, with the object of reducing complicated configuration processing for installing an MFP system, in a plurality of multifunction peripherals connected to a network, configuration processing can be performed collectively by means of an automatic or manual instruction by transmitting desired device information to the other multifunction peripherals and reflecting the device information to the other multifunction peripherals.

JP-A-7-302032 mentions an MFP system in which a printer, copier, scanner, and facsimile or other functions are collectively installed in a single device as in the past. Such an MFP system can not only be utilized as a stand-alone printer or scanner but also functions as a copier without the intervention of a computer, has a telephone jack, and has a function for transmitting a read manuscript as a facsimile.

Furthermore, in the case of the MFP system according to JP-A-2000-187573, all the functions that can be implemented by means of a combination of image input devices and image output devices that are currently connected to the network are displayed so that the user is able to select the desired function (copier, facsimile transmission or the like) from among the displayed functions. As a result, there is the possible unforeseen inconvenience for the user that a function will be executed by using a device that was not intended by the user.

That is, there are instances where, when a color copy function is selected, for example, a color printer is not actually present in the vicinity of the user. Here, the user must pick up the printed matter that is output to a color printer that is far away from the user, which is inconvenient. There is also the risk that the printed matter will be output by a color printer on a different floor or by a color printer in a remote location which is connected via a WAN, meaning that there is also a problem from the perspective of the security of the printed matter.

In addition, depending on the case, the user may consider that, if a color printer is not in the vicinity, a printout via a monochrome printer will suffice. However, according to the invention that appears in JP-A-2000-187573, because it is necessary to first select the function, it is not possible to deal flexibly with such a situation.

Further, in the case of the MFP system that appears in JP-A-2004-153639, when the network environment or the like is changed, the user must personally update the device information for at least the first one. Hence, although it is possible to dispense with the need to configure the same device information for a plurality of multifunction peripherals, there is room for improvement with respect to completely automating the configuration processing.

Furthermore, in the case of the MFP system that appears in JP-A-2004-153639, the synchronization timing for sharing the device information between a plurality of devices is limited to fixed cases such as when the user has updated the device information. As a result, it is difficult to flexibly configure the environment with respect to an unforeseen even such as system failure.

In addition, unlike the MFP system appearing in JP-A-7-302032, a digital multifunction peripheral of the dispersed device-type constituted such that each of the devices constituting the MFP system are disposed dispersed over the network, being installed in separate locations, has been proposed. Such a digital multifunction peripheral may have, for example, a manuscript-reading device for reading manuscripts (scanner) installed in a separate location from the image-forming device (printer), which are each connected by means of a network or the like. A dispersed-device-type digital multifunction peripheral of this type is capable of dispersing the locations in which the respective devices constituting the digital multifunction peripheral are installed. Hence, the freedom in the layout when the digital multifunction peripheral is installed increases. However, the respective devices which are disposed in dispersed fashion are dedicated devices that constitute part of the digital multifunction peripheral. A general-purpose scanner, for example, cannot be used as the manuscript-reading device of the digital multifunction peripheral.

SUMMARY

The present invention was conceived in view of such a situation, a first aspect of the present invention being to provide an MFP system making it possible to easily select and execute a desired processing function as a result of the user combining optional devices in an MFP system in which devices such as a scanner and a printer and so forth are disposed in dispersed fashion on a network.

Furthermore, a second aspect of the present invention is to provide an MFP system in which a plurality of multifunction peripheral units are disposed dispersed on a network, in which system individual multifunction peripheral units automatically acquire information related to devices such as a scanner that performs processing to synchronize data with optional timing.

In addition, an advantage of some aspects of the invention is the ability to constitute a digital multifunction peripheral by freely combining a general-purpose I/O device. Further, in the case of a terminal device that executes print instructions and so forth, a third aspect is the ability to perform driverless printing and so forth without the need to install a driver for controlling the device.

In order to resolve the first aspect, the multifunction peripheral of the present invention comprises list transmission means that creates a list of devices connected to a network and transmits the list to a user terminal; device information reception means that receives information on a device selected by the user from a user terminal constituting the transmission destination for the list; processing function list transmission means that creates a list of the processing functions that can be executed by the device on the basis of the received device information and transmits the list of the processing functions to the user terminal; processing function information reception means that receives information on a processing function selected by the user from a user terminal constituting the transmission destination for the processing function list; and execution control means that controls the device to execute the processing function on the basis of the received device information and processing function information.

'Devices' according to the present invention signifies devices capable of inputting and/or outputting information such as images and so forth and include image input devices such as scanners and image output devices such as printers. Further, 'processing functions' include functions that can be implemented by optionally combining image input devices and image output devices such as a copy function, a network scanner (image capture) function, a facsimile function, a projection function, and a binding function.

According to the present invention, a list of devices that can be utilized is first presented on a first screen of a browser terminal used by the user, whereupon a list of processing functions is presented on a second screen. Accordingly, the user first selects the device that is to be used and then selects the processing function that they wish to execute. Thus, by using a multifunction peripheral unit that is connected to devices such as a scanner and printer via a network, the desired processing functions are easily selected by combining the optional devices so that the desired processing functions can be executed.

Furthermore, under the condition that devices such as a scanner and printer are disposed dispersed on a network, a user interface that flexibly fulfils the purpose of the user and follows the line of flow of the user by allowing the user to first select the device that is to be used and then select what the processing function permitted by the device is to be can be provided.

Further, preferably speaking, the multifunction peripheral further comprises device-specific information storage means that stores device-specific information for identifying devices connected to the network, wherein the list transmission means references information stored in the device-specific information storage means to create the list.

According to the present invention, devices that are connected to the network can be reliably managed by utilizing the device-specific information storage means.

In addition, preferably speaking, the multifunction peripheral unit further comprises UI information storage means that stores information related to the processing functions that can be executed by the respective devices connected to the network, wherein the processing function list transmission means references the information stored in the UI information storage means to create a list of the processing functions.

According to the present invention, the processing functions that can be performed by using the device selected by the user can be easily extracted by using UI information storage means.

In addition, preferably speaking, the multifunction peripheral unit further comprises model information storage means that associates and stores device-specific information on devices that can be connected to the network and information relating to drivers for controlling the devices; and means that, when a device is newly connected to the network, searches the model information storage means based on the device-specific information on the newly connected device and installs a driver for the newly connected device.

According to the present invention, when a device is newly connected to the network, the driver for controlling the newly connected device can be automatically installed.

Furthermore, the multifunction system of the present invention is a system in which a multifunction peripheral unit, a user terminal, and a plurality of devices are connected to a network. Further, the multifunction peripheral unit comprises list transmission means that creates a list of devices connected to the network and transmits the list to the user terminal; device information reception means that receives information on a device selected by the user from a user terminal constituting the transmission destination for the list; processing function list transmission means that, based on the received device information, creates a list of the processing functions that can be executed by the device and transmits the list of is the processing functions to the user terminal; processing function information reception means that receives information on a processing function selected by the user from a user terminal constituting the transmission destination for the processing function list; and execution control means that controls the device to execute the processing function on the basis of the received device information and processing function information. Further, the user terminal comprises list presentation means that receives the list from the multifunction peripheral unit and presents the list to the user; device information transmission means that transmits information on a device selected from the list to the multifunction peripheral unit; processing function list presentation means that receives the processing function list from the multifunction peripheral unit and presents the processing function list to the user; and processing function information transmission means that transmits information on the processing function selected from the processing function list to the multifunction peripheral unit.

According to the present invention, an available device list is first presented on a first screen of the browser terminal used by the user, whereupon a processing function list is presented via a second screen. Accordingly, as a result of first selecting the device that is to be used and then selecting the processing function to be executed, the user is able to execute the desired processing function by easily selecting the desired processing function by combining optional devices of an MFP system in which devices such as a scanner and a printer are disposed dispersed on a network.

Furthermore, the processing function selection method according to the present invention is a method that allows a user to select a processing function, of a multifunction peripheral unit that comprises control means that controls the multifunction peripheral unit, the method comprising a step in which the control means creates a list of devices connected to a network and transmits the list to a user terminal; a step in which the control means receives information on a device selected by the user from a user terminal constituting the transmission destination for the list; a step in which the control means creates a list of the processing functions that can be executed by the device based on the received device information and transmits the list of the processing functions to the user terminal; a step in which the control means receives information on a processing function selected by the user from a user terminal constituting the transmission destination for the processing function list; and a step in which the control means controls the device to execute the processing function on the basis of the received device information and processing function information.

According to the present invention, an available device list is first presented on a first screen of the browser terminal used by the user, whereupon a processing function list is presented via a second screen. Accordingly, the user first selects a device that is to be used and then selects the processing function to be executed. Thus, a method in which a desired processing function is executed by easily selecting the desired processing function by combining optional devices can be provided.

In order to resolve the second aspect, the multifunction peripheral unit of the present invention comprises storage means for storing at least device-specific information which allows devices connected to a network to be identified, and which is automatically acquired from the devices; data synchronization means for sharing device-specific information by synchronizing device-specific information to be stored in the storage means and another storage means, which another multifunction peripheral unit connected to the network comprises, between the storage means and the other storage means; and activation means for activating the data synchronization means with pre-specified timing.

According to the present invention, a multifunction peripheral unit that automatically acquires and manages information related to devices such as a scanner can be provided. Further, the multifunction peripheral unit is able to perform processing for data synchronization with other multifunction peripheral units with optional timing. Hence, synchronization processing of shared data can be executed with the required timing without placing an unnecessary load on the communication traffic.

Furthermore, the multifunction peripheral unit further comprises installation means that references device-specific information stored in the storage means and installs a driver for controlling a device specified by the device-specific information, wherein the data synchronization means synchronizes the driver-related information, in addition to the device-specific information, between the multifunction peripheral unit and the other multifunction peripheral unit.

According to the present invention, it is possible to share and manage drivers for controlling devices connected to the network between a plurality of multifunction peripheral units and processing to set the drivers can be easily carried out.

In addition, the activation means of the multifunction peripheral unit activates the data synchronization means with the timing at which the power supply of the multifunction peripheral unit itself is turned ON or with the timing at which the multifunction peripheral unit itself recovers from failure.

According to the present invention, data synchronization processing can be activated flexibly with various timing in accordance with the state of the system. Hence, the environment can be established flexibly for unexpected events such as system failure.

Furthermore, in the multifunction system of the present invention, a plurality of multifunction peripheral units are connected to a network. Here, each of the multifunction peripheral units comprises storage means for storing at least device-specific information which allows devices connected to the network to be identified and which is automatically acquired from the devices; data synchronization means for sharing device-specific information by synchronizing device-specific information to be stored in the storage means and another storage means, which another multifunction peripheral unit connected to the network comprises, between the storage means and the other storage means; and activation means for activating the data synchronization means with pre-specified timing.

Furthermore, the data synchronization method according to the present invention is a data synchronization method of a multifunction peripheral unit that has control means for controlling processing of the multifunction peripheral unit and storage means for storing at least device-specific information that allows devices to be identified. First, the control means acquires device-specific information from devices connected to the network and stores the acquired device-specific information in the storage means. Thereafter, the control means shares device-specific information by synchronizing device-specific information to be stored in the storage means and another storage means, which another multifunction peripheral unit connected to the network comprises, between the storage means and the other storage means with pre-specified timing.

According to the present invention, a multifunction peripheral unit in which information relating to devices such as a scanner is automatically acquired and managed can be provided. Further, the multifunction peripheral unit is able to execute processing for data synchronization with other multifunction peripheral units with optional timing. Hence, the environment can be established flexibly in accordance with the state of the system. In addition, because a plurality of multifunction peripheral units are disposed dispersed on the network, measures against system failure involving load distribution and redundancy and so forth can be obtained.

The program of the present invention allows a computer to execute the respective processing steps of the data synchronization method of the present invention. The program of the present invention can be installed or loaded on the computer via a variety of recording media such as an optical disk such as a CD-ROM, a magnetic disk, or semiconductor memory or as a result of a download via a communication network.

In order to resolve the third aspect of the present invention, the multifunction peripheral of the present invention comprises model information storage means that associates and stores information related to devices such as peripheral devices and device drivers for controlling the devices; communication means for gathering device-specific information for identifying the devices between the devices connected to the network; and checking means that places a device driver that corresponds with a device specified by the device-specific information gathered from the model information storage means in a reading operational state on the basis of the device-specific information gathered by the communication means. According to the present invention, a digital multifunctional peripheral can be constituted by freely combining general-purpose I/O devices as a result of the multifunction peripheral automatically gathering and checking device-specific information and automatically reading the device drivers of the devices connected to the network. Furthermore, printing can be performed driverlessly by a terminal device that executes print instructions and so forth.

Preferably, with the multifunction peripheral of the present invention, information relating to the devices such as peripheral devices and device drivers for controlling the devices are associated and stored in the model information storage means. The multifunction peripheral preferably further comprises output means for outputting data acquired by devices controlled by the device driver placed in an operational state by the checking means. In this instance, the output means desirably comprises image-forming means for forming images on the basis of the input data. Furthermore, the devices connected to the network desirably include an image-forming device such as a scanner.

Furthermore, the method of checking the device-specific information of the multifunction peripheral of the present invention is a method of checking device-specific information for identifying devices of a multifunction peripheral that comprises control means that controls the operation of the multifunction peripheral and model information storage means that associates and stores information relating to devices such as peripheral devices and device drivers for controlling the devices, comprising the steps of gathering device-specific information on the devices between the devices connected to the network; and placing a device driver that corresponds to a device specified by the device-specific information gathered from the model information storage means in a reading operational state on the basis of the gathered device-specific information. According to the present invention, a digital multifunctional peripheral can be constituted by freely combining general-purpose I/O devices as a result of the multifunction peripheral automatically gathering and checking device-specific information and automatically reading the device drivers of the devices connected to the network. Furthermore, printing can be performed driverlessly by a terminal device that executes print instructions and so forth.

The program of the present invention allows a computer to execute the respective processing steps of the processing function selection method of the present invention. The program of the present invention can be installed or loaded on the computer via a variety of recording media such as an optical disk such as a CD-ROM, a magnetic disk, or semiconductor memory or as a result of a download via a communication network.

'Device-specific information' of the present invention is information that permits devices which are connected to the network to be uniquely identified on the network and is information that the respective devices hold uniquely. More specifically, for example, device-specific information is constituted by means of a combination of product names, product serial numbers, fabrication dates, and version numbers. Further, 'model information' of the present invention is information relating to the models of the respective devices (products) that are controlled by the multifunction peripheral of the present invention.

In the case of the present invention, 'means' does not simply signify physical means but rather also includes cases where the functions of the means are implemented by software. In addition, the functions that one means possesses may be implemented by two or more physical means or the functions of two or more means may be implemented by one physical means.

BRIEF DESCRIPTION OF THE DRAWINGS

FIG. 3 is a block diagram of an example of the system constitution of the MFP system 100 according to the first embodiment;

FIG. 4 shows an example of the table constitution of a device-specific information table 24 according to the first embodiment;

FIG. 5 shows an example of the table constitution of a model information table 25 according to the first embodiment;

FIG. 9 shows an example of a first screen 41 that is presented on a browser terminal 40, FIG. 10 shows an example of a second screen 42 that is presented on the browser terminal 40;

FIG. 11 shows an example of a third screen 43 that is presented on the browser terminal 40;

FIG. 14 is an example of a table constitutional view of the device-specific information table 24 according to the first embodiment;

FIG. 15 is an example of a table constitutional view of a model information table 25 according to the first embodiment;

DESCRIPTION OF EXEMPLARY EMBODIMENTS

Embodiments of the present invention will be described in detail hereinbelow. The same numerals are assigned to the same elements and repetitive description is omitted. Furthermore, the following embodiments are illustrations serving to explain the present invention, there being no intention to limit the present invention to these embodiments. In addition, a variety of modifications are possible without departing from the spirit of the present invention.

Figure 1:
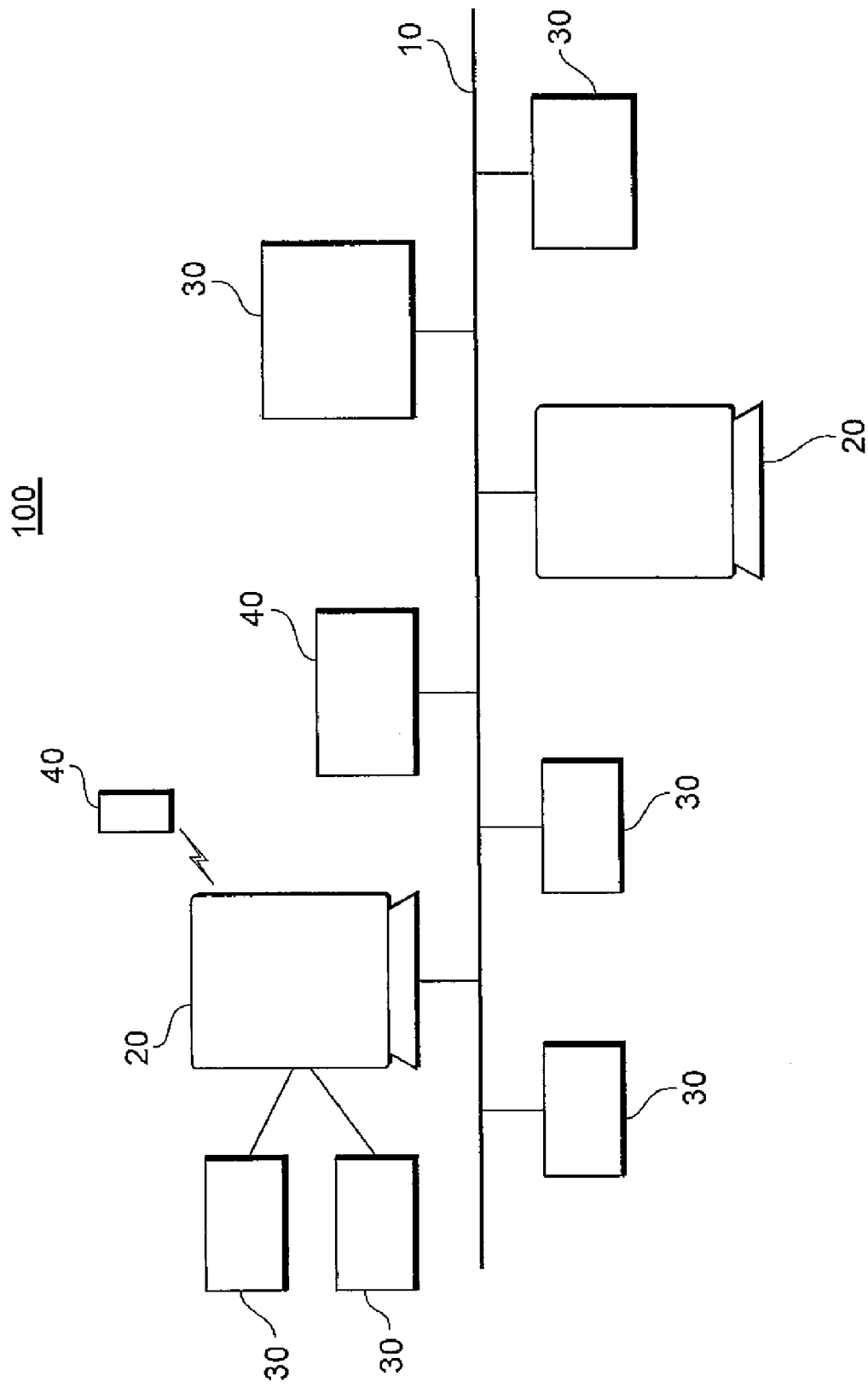
FIG. 1 shows a schematic constitution of an MFP system 100 according to a first embodiment of the present invention.

FIG. 1 shows a schematic constitution of multifunction system 100 according to the first embodiment of the present invention (referred to as 'MFP system 100' hereinbelow). As shown in FIG. 1, this MFP system 100 is constituted having one or more digital multifunction peripheral units 20 (called 'unit 20' hereinbelow) connected to a network 10. Further, various devices 30 capable of inputting and outputting images and so forth are connected to the network 10 or unit 20. In addition, the MFP system 100 is constituted comprising the browser terminal 40.

The network 10 is a communication line for sending and receiving information between the units 20, various devices 30 or the browser terminal 40 and may be a LAN, the Internet, a dedicated line, a packet communication network, a telephone line, another communication line, or a combination thereof, for example, and may be either a wired or wireless communication line.

The units 20 are computer devices which manage device-specific information for the device 30 which is connected to the network 10 and control optional devices 30. Further, the units 20 connect devices 30 such as a print engine to a path or externally connect the devices 30 via a local connection terminal such as a USB, whereby it is possible to perform control of the devices 30. Further, a variety of processing functions such as printing, copying, image capture, and facsimile by suitably combining any two or more of the following devices: an optional device 30 that is connected to the network 10, a device 30 that is connected to the path of the unit 20, or a device 30 that is connected externally to the unit 20 via a USB or other local connection terminal.

In addition, the respective units 20 comprise storage means for storing and managing data and are constituted such that, in cases where a plurality of units 20 are connected to the network 10, there is co-operation between a plurality of predetermined optional units 20 such that same virtually act as one unit and common data are synchronized.

Here, an optional procedure can be adopted for the common management of data. For example, one data item can be divided and stored and managed in batches by a plurality of units 20 or the same data may be copied and stored redundantly by a plurality of units 20 (so-called mirroring). In addition, common data may be stored to one unit 20 while another unit 20 assigns a link by recording the path to the common data. In addition, identifiers may be indexed and stored for common data in one unit 20 while another unit 20 may use the identifiers to reference the common data.

The device 30 is connected to the network 10 or unit 20 and has a function that makes it possible to input or output images and so forth. More specifically, the devices 30 include the following devices.

Devices for inputting images and so forth include, for example, a scanner for optically reading images and so forth that are displayed on a sheet, a digital whiteboard for optically reading images and so forth that are displayed on a board, and a digital camera or the like that records photographed images as digital data.

Devices for outputting images and so forth include, for example, an image-forming device such as a printer that forms an image by means of an electronic transfer system or the like, a projector that projects images onto a screen, a viewer or the like that displays images on a display means such as a liquid-crystal panel.

Furthermore, devices for inputting and outputting images and so forth include, for example, a FAX modem that transmits or receives facsimiles and storage for optically or magnetically storing data such as a hard disk device. Further, FAX modems include not only those provided in a personal computer but also a dedicated facsimile device that can be connected to the network 10. In addition, the storage includes a hard disk device that a personal computer (called a 'PC' hereinbelow) comprises and storage that is connected indirectly to the network 10.

Further, in this specification, when there is no need to distinguish the types of devices connected to the network, devices connected to the network are described using the collective term 'device 30'.

The browser terminal 40 is a device for communicating with the unit 20 via the network 10 or directly by means of infrared communications. This may be any device as long as same comprises a Web browser for reading information that is distributed by the Web server. For example, a PC, cellular phone, or personal digital assistant (PDA) or the like fall into this category. A processing device such as a CPU that the browser terminal 40 comprises allows the browser terminal 40 to function as means for presenting predetermined information or send/receive means by executing a predetermined program that is stored in a memory or external storage device or the like.

The user of the MFP system 100 is able to issue a processing instruction by using the browser terminal 40 to access an optional unit 20. When the external storage device is provided in the browser terminal 40, the external storage device functions as a storage device (device 30) that is connected to the network 10.

Figure 2:
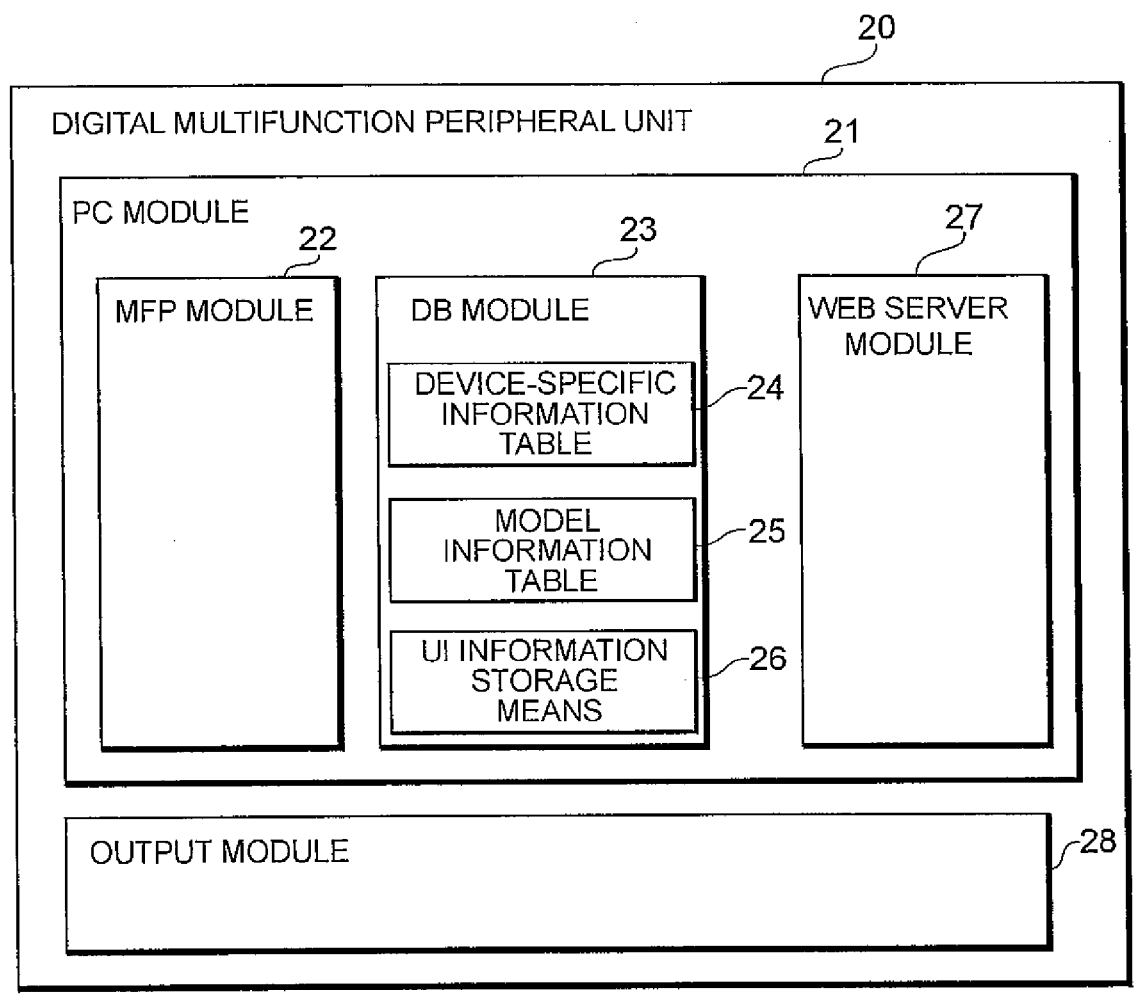
FIG. 2 is a block diagram showing the constitution of the functions of a unit 20.

FIG. 2 is a block diagram showing the constitution of the functions of unit 20. Unit 20 comprises a PC module 21 and an output module 28. The PC module 21 has a function that combines a server, driver, and controller with a device 30 such as a printer. Further, the PC module 21 further comprises an MFP module 22, a DB module 23, and a Web server module 27.

The MFP module 22 is a module serving to communicate with other devices (units 20, devices 30, and browser terminal 40). The MFP module 22 comprises means for transmitting or receiving various information to and from other optional devices, means for acquiring device-specific information on the devices 30 connected to the network 10 and registering this information in the device-specific information table 24 (described subsequently), means for installing a driver, on the unit 20, for identifying newly connected devices 30 based on the device-specific information and controlling the devices 30, and means for controlling the execution of the processing of the devices 30 in cases where the driver of the devices 30 has been installed.

As a result of the MFP module 22 communicating with optional devices 30 which are connected to the network 10 and controlling these devices 30, the unit 20 provides various functions (printing, copying, image capture, facsimile and so forth) for multifunction peripherals (MFP) by combining optional devices 30

The DB module 23 is a module for recording and managing, as a database (DB), in the storage means a variety of information that is required by the unit 20 for controlling and managing the MFP system 100. Furthermore, the DB module 23 comprises data synchronization means that perform synchronization processing on common data by co-operating with the DB module 23 of another unit 20. In addition, means for activating the data synchronization means with pre-specified timing are provided. In this embodiment, a device-specific information table (device-specific information storage means) 24 for recording and managing device-specific information of the device 30 that is connected to the network 10, a model information table (model information storage means) 25 for registering model information of devices that the unit 20 is able to control, and UI information storage means 26 for storing information relating to the user interface (referred to as 'UI' hereinbelow) presented on the browser terminal 40 of the user utilizing the MFP system 100 are recorded and managed by the DB module 23.

Although not illustrated here, the DB module 23 records and manages not only device-specific information and information relating to other devices but also records and manages various information. For example, general files, information on the locations of other units 20, and management information including user IDs and passwords are managed.

The device-specific information table 24 is a table that manages device-specific information on the devices 30 connected to the network 10 and holds device-specific information including the product name, for example, for each individual device 30. The table 24 may additionally store information such as the serial number, fabrication date, and location. The units 20 grasp which devices 30 are connected to the network 10 by referencing the table 24. Further, based on the device-specific information recorded in the table 24, the unit 20 performs processing to control the respective devices 30 and present the available devices to the user.

The model information table 25 records and manages model information for installing the required drivers as a result of the unit 20 checking the devices 30 when a device 30 is newly connected to the network 10. The model information table 25 records and manages model information for products that can be utilized by the unit 20 and, when a new model such as a new product comes onto the market, model information corresponding to the new model is acquired from a database or the like of a predetermined server computer (not illustrated here) that is determined beforehand, and additionally registered in the model information table 25. For example, each time a new product is released, model information on the new product is additionally registered on the manufacturer's web site and the unit 20 accesses a predetermined server computer (mentioned earlier) with predetermined timing such as when a device 30 is newly connected to the network 10, automatically downloads model information on the new product, and additionally registers the model information in the model information table 25. Further, the new registered processing is preferably executed in the background.

The screen information and transitions thereof which are presented on the browser terminal 40 that has accessed the unit 20 are recorded and managed by the UI information storage means 26. By referencing the UI information storage means 26, the unit 20 first presents a first screen for selecting the device to be used from a device list that is connected to the network 10 on the browser terminal 40 and then presents a second screen on which a list of the processing functions that can be executed by using the selected device are displayed.

The Web server module 27 is a module that comprises means that function as a Web server for distributing Web information. Communication is performed with the browser terminal 40 directly by means of infrared communications via the network 10 and Web information is distributed to the browser terminal 40. The browser terminal 40 produces a screen display or the like based on the received Web information.

Further, when a plurality of units 20 are connected to the network 10, PC modules 21 that the respective units 20 comprise co-operate with one another such that information which is managed by the respective DB modules 23 is made common information, and, as a result of the respective modules 22, 23, and 27 performing processing in sync with each other, the plurality of units 20 function so as to behave as one virtual unit.

The output module 28 is a module comprising means for inputting and outputting data such as images. Here, the I/O means include, for example, devices such as image-forming means for forming images by means of an electronic transfer system or the like on the basis of input data (a so-called 'print engine'), an RGB output terminal for outputting images as a display to a display or the like, and a hard disk device (external storage device) for inputting and outputting files.

Modules are the units of a component that has a group of functions. The respective modules are constituted by dedicated hardware or by software that is implemented as a result of control means such as a CPU executing a predetermined program that is stored in memory or the like. The respective modules above may be constituted by a single piece of hardware; the respective modules may each be constituted by individual pieces of hardware. The respective modules may also be implemented by software in one or a plurality of computers.

The present invention will be described next by assuming a specific system constitution

First Embodiment

FIG. 3 is a block diagram of an example of a specific system constitution of the MFP system 100. In the example shown in FIG. 3, two units 20A and 20B are connected to the network 10. Further, a monochrome printer 30A and a scanner 30B are connected externally to a unit 20A. Further, connected to the network 10 are a hard disk device (referred to as 'HDD' hereinbelow) 30D, a color printer 30E, a scanner 30F, and a FAX modem 30G. The FAX modem 30G is connected to a telephone line network 15 so that FAX data can be sent and received via the telephone line network 15.

In addition, a PC 40A comprising a HDD 30C is connected to the network 10. The HDD 30C is then connected to the network 10 via the PC 40A. Further, a portable terminal 40B that comprises the Web browser is then able to communicate directly with the unit 20A by means of infrared communications.

FIG. 4 shows an example of the table constitution of the device-specific information table 24. As shown in FIG. 4, the device-specific information table 24 comprises a device-specific information field 51 for devices 30 (30A to 30G in the first embodiment) that are connected to the network 10 and a reference information field 52 that is set by the administrator or the like. In the example shown in FIG. 4, the device-specific information field 51 contains a product name field 53 that indicates the product name, a product serial number field 54 that indicates the product serial number, a manufacturing date field 55 that indicates the manufacturing date, and a version number field 56 that indicates the version number. Further, the reference information field 52 contains a general name field 57, a location field 58, and a group field 59 for the devices.

The units 20 automatically negotiates with the respective devices 30 that are connected to the network 10 to acquire information that is stored in the device-specific information field 51. Further, 'negotiation' signifies that two devices communicate while exchanging information with one another.

Furthermore, although the location field 58 is a field that indicates the installation point of the device, in the present invention, 'location' is not limited to the physical installation point when a device or the like is installed and may also signify a logical position on a network.

The administrator or the like of the network 10 sets and registers groups for the respective devices 30 in the group field 59. The unit 20 exercises control so that only devices that belong to the same group as the user group to which the user belongs can be used. Thus, by setting groups for the devices, access to the respective devices can be managed in group units. Hence, devices that can be utilized can be flexibly configured for each user group. When groups have not been set such as directly after device-specific information has been registered, the devices are preferably set to belong to all the groups.

FIG. 5 is an example that shows an example of the table constitution of the model information table 25. As shown in FIG. 5, the model information table 25 contains a product name field 61 that indicates the product name, a product serial number field 62 that indicates the product serial number, and an information field 63 relating to the driver that allows the unit 20 to control the relevant products. The information field 63 relating to the driver may be the driver execution program or may be link information for installing the driver. Further, if required, an information field 64 for the manufacturing date and the version number and so forth may also be included.

The model information table 25 stores and manages information relating to the models (products) that can be utilized by the unit 20. When a new model such as a new product comes onto the market, model information corresponding to the new model is registered in the database of a predetermined computer (not illustrated) which is determined beforehand. For example, each time a new product is released, model information on the new model is additionally registered on the manufacturer's web site. The unit 20 accesses a the above-mentioned predetermined computer with predetermined timing such as when a device is newly connected to the network 10, and model information on the new model is automatically downloaded and additionally registered in the model information table 25. Further, the new registration processing is executed in the background.

Figure 6:
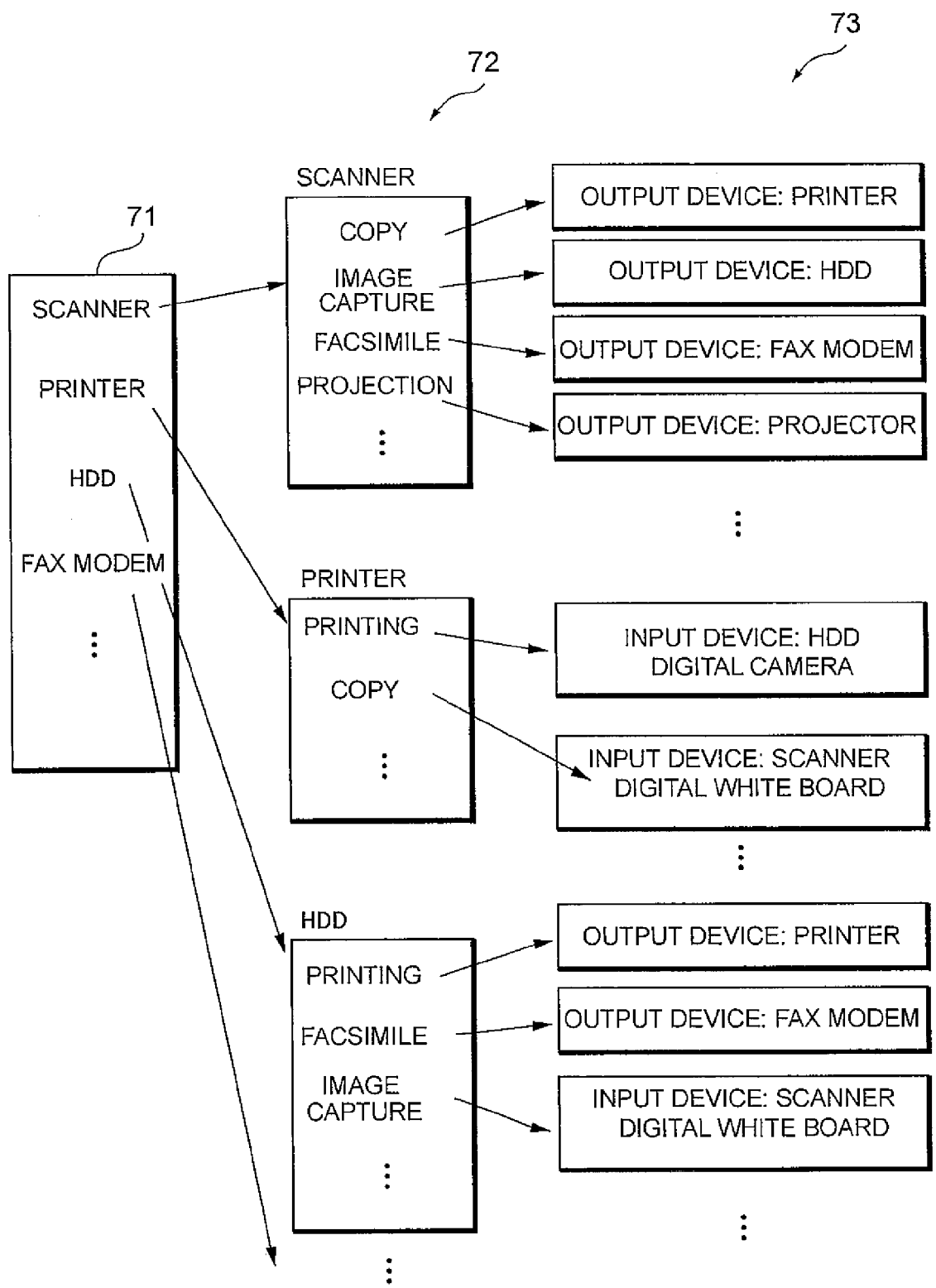
FIG. 6 shows an example of a data structure that is stored in the IU information storage means 26.

FIG. 6 shows an example of the data structure that is stored in the UI information storage means 26. As shown in FIG. 6, information related to the state transition of the screen presented on the browser terminal 40 is managed by means of a tree structure by the UI information storage means 26. A list of the devices that can be used by the MFP system 100 is managed by a root part 71 of this tree structure. A child node 72 exists for each device and a list of processing functions that can be executed by using the respective devices is managed. In addition, a descendant node 73 exists for each processing function and a list of devices that are required when executing the processing functions that employ each device is managed.

An overview of the operation of the MFP system according to the first embodiment will be described next.

First Embodiment

The first embodiment relates to a user interface technology according to which the unit 20 selects the processing functions of the MFP system 100. As will be detailed hereinbelow, the user interface technology is constituted such that a list of the devices that are currently connected to the network is presented to the user. In addition, the user interface technology is constituted such that, after the user has selected the device that is to be used, a list of the processing functions that can be executed by the selected device is presented to the user. As a result, once the user has selected the device that is to be used, it is possible to select which processing is to be executed by using this device.

Figure 7:
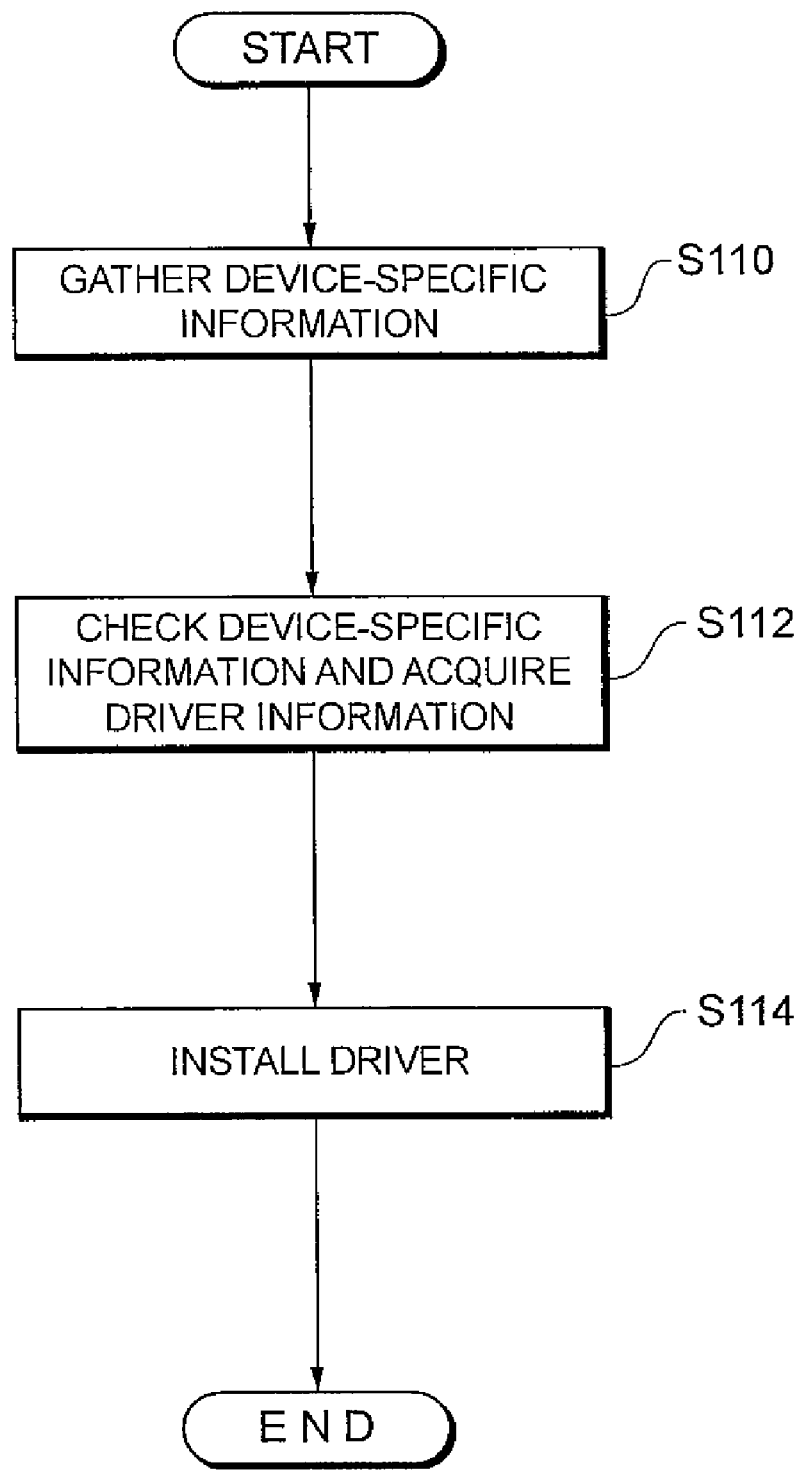
FIG. 7 shows the flow of processing when a device 30 is newly connected.

FIG. 7 is a flowchart that shows the flow of processing when a device 30 is newly connected to the network 10.

First, when a device 30 such as a scanner is newly connected to the network 10, the unit 20 negotiates with the device 30 gathers device-specific information and stores same in the device-specific information table 24 (S110). Thereafter, the unit 20 checks the device-specific information against the model information table 25 and acquires information relating to the driver required for the control of the newly connected device 30 (S112). Because the information relating to the driver stores the link destination where the driver is stored or a driver program, the driver is installed based on this information (S114). Thus, the unit 20 is able to register and manage the device-specific information for the device 30 connected to the network 10 in the device-specific information table 24, and install the driver that controls each device 30 in the unit 20 so that the device 30 can be utilized by the unit 20.

Figure 8:
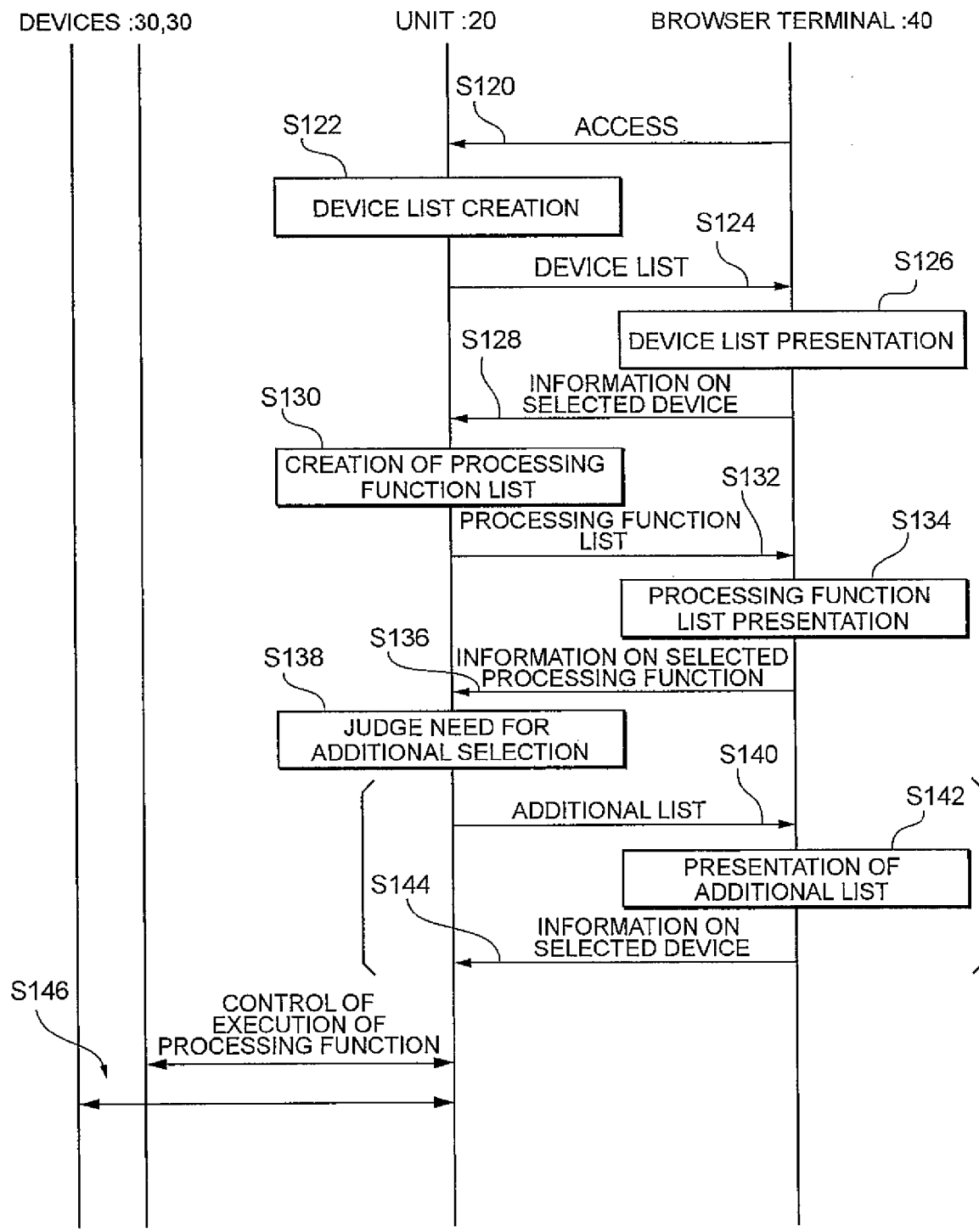
FIG. 8 is a sequence chart when the processing functions are executed.

FIG. 8 is a sequence chart when the processing functions such as copying are executed by the MFP system 100.

The user first accesses the unit 20 by using the Web browser of the browser terminal 40 (S120). Thereupon, the browser terminal 40 accesses the unit 20 via the network 10 or directly by means of infrared communications or the like.

When accessed by the browser terminal 40, the unit 20 searches the device-specific information table 24 and creates a list of available devices by extracting the devices 30 which are connected to the network 10 (S122). For example, in the example of the device-specific information table 24 shown in FIG. 3, when the user of the browser terminal 40 is the user of group A, a list of available devices is created by extracting the device-specific information relating to group A.

Thereafter, the unit 20 transmits this list to the browser terminal 40 which first accessed the unit 20 (S124). Thus, when the list is transmitted by the unit 20 to the browser terminal 40, the browser terminal 40, which receives this list, presents the list of available devices in a comprehensible state to the user, more specifically, by using a method such as displaying the list on a display device (S126).

FIG. 9 shows an example of the display screen (first screen) 41 of a list of available devices that are presented on the browser terminal 40. In the first embodiment, a scanner 1, scanner 2, monochrome printer, color printer, 40G-HDD, 60G-HDD, and FAX modem are presented as available devices. When the names and installation points of the respective devices are contained in the list transmitted by the unit 20, this information is preferably presented simultaneously. Furthermore, in addition to a general name for the devices, it may be possible to present the characteristics of the respective devices such as A3/A4 compatibility.

Thereafter, when the user selects the device that is to be used by means of input means or the like from the list of available devices presented on the browser terminal 40, information on the device selected by the user is transmitted by the browser terminal 40 to the unit 20 (S128 in FIG. 8).

The unit 20 creates a list of processing functions that can be executed by the MFP system 100 by using the device on the basis of the information on the device selected by the user (S130). More specifically, the unit 20 searches the UI information storage means 26 on the basis of the information on the selected device received from the browser terminal 40 and uses the device selected by the user to extract candidates for the executable processing functions. In addition, by referencing the device-specific information table 24, unnecessary processing functions come to be removed from among the candidates, such unnecessary processing functions being mixed up with the devices currently connected to the network 10. Thus, a list of the processing functions that can be executed by the user by using the selected device is created. Further, preferably speaking, when the list of processing functions is created, user groups may be added.

Following the creation of the list, the unit 20 transmits a list of the processing functions to the browser terminal 40 which was the transmission source of the selected device information (S132). Thereafter, the browser terminal 40 which received the list of processing functions presents a list of processing functions in a state that is comprehensible to the user and, more specifically, by means of a method such as a display on a display device (S134).

FIG. 10 shows an example of a display screen (second screen) 42 for the list of processing functions that is presented on the browser terminal 40. Here, assuming that 'scanner 1' has been selected by the user via the first screen, 'copy', 'image capture', and 'FAX transmission' are displayed as a list as processing functions that can be executed by the MFP system 100 by using the 'scanner 1'.

Thereafter, when the user uses the input means or the like to select a desired processing function from among the list of processing functions presented on the browser terminal 40, information relating to the processing functions selected by the user is transmitted by the browser terminal 40 to the unit 20 (S136 in FIG. 8).

When the unit 20 executes the device and processing function selected by the user on the basis of the received processing-function-related information and the information recorded in the UI information storage means 26 and device-specific information table 24, it is judged whether it is necessary to add and select an input device or output device (S138).

For example, in the first embodiment, when the user selects 'copy' via the second screen, the unit 20 identifies the fact that the output device is a printer on the basis of the information recorded in the UI information storage means 26. Thereupon, when the device-specific information table 24 is referenced, because it can be seen that two printers are connected to the network 10, it is clear that it is necessary to additionally select which of the two printers is to execute the print processing.

Meanwhile, when the user selects 'FAX transmission' via the second screen, the unit 20 is able to uniquely specify that the device that transmitted the image captured by the scanner 1 as a FAX transmission is the FAX modem 30G on the basis of the UI information storage means 26 and device-specific information table 24. Hence, the unit 20 is then able to judge that it is not necessary to select any more devices.

Thus, the unit 20 judges whether there is a need for an additional selection of a device and, when it is necessary to additionally select a device, the unit 20 creates a list of additional selection devices relating to an input device or output device for executing a desired processing function and transmits the additional list to the browser terminal 40 (S140). Further, the unit 20 presents the addition list thus received by means of a method such as a display on the display device of the browser terminal 40 (S142).

FIG. 11 shows an example of a display screen (third screen) 43 of a list of additional selection devices that is presented on the browser terminal 40. Here, assuming that the user selects 'scanner 1' via the first screen and selects 'copy' via the second screen, a list of output devices that can be utilized in the copy processing for the image captured by the 'scanner 1', that is, a list of available printers is displayed. Thus, the user selection with respect to which printer is to be used for the printing (copy processing) is awaited.

Thereafter, when the user uses input means or the like to select the device that is to be utilized from among the list of additional selection devices presented on the browser terminal 40, information on the device selected by the user is transmitted by the browser terminal 40 to the unit 20 (S144 in FIG. 8).

Further, when it is judged that it is not necessary to additionally select a device in step S138 or when information on an additionally selected device is received from the browser terminal 40, the unit 20 exercises control so that the processing function designated by the user is executed with respect to the devices 30 determined on the basis of the user selection (S146).

For example, according to the first embodiment, when the user has selected the 'scanner 1' via the first screen, 'copy' via the second screen, and 'color printer' via the third screen, the unit 20 controls the scanner 1 (device 30B) to scan the image from the sheet and acquire image data, and exercises control to send the acquired image data to the color printer (device 30E) and execute printing. Thus, by combining optional devices 30 that are disposed dispersed on the network 10, it is possible to execute processing functions such as printing, copying, image capture, and facsimile.

As outlined hereinabove, a list of available devices is first presented on the first screen by the browser terminal 40 used by the user of the MFP system 100, whereupon a list of processing functions is presented on the second screen. The user initially selects the device that is to be used and then selects the processing function that the user desires to execute. Thus, according to the present invention, the selection of the device to be used is made prior to the selection of the processing function mainly for the following reasons.

In other words, in the case of a digital multifunction peripheral in which the scanner and printer are integrally formed, for example, even when the processing function is first selected, because the processing function may be executed by using a device such as the scanner or printer that are formed integrally with the multifunction peripheral, there is no particular inconvenience. However, in the case of the multifunction peripheral according to the first embodiment (digital multifunction peripheral unit) that is based on the premise of a situation where devices such as a scanner and printer are disposed dispersed on a network, when the processing function is selected first, a situation where the device that executes the processing function is installed in a remote location arises. In such a case, this has the negative result that printed matter comes out on the wrong floor, for example, and adversely affects the aims of the user wishing to use the multifunction peripheral.

Further, the user will often consider performing some kind of processing using devices in the user's own vicinity. For example, if a printer is only installed in a remote location, the user will sometimes abandon printing and instead consider prioritizing the storage of images as files for the time being.

Therefore, according to the present invention, by selecting the device that is to be used without first selecting the processing function, it is possible to meet the needs of the user who is prioritizing the execution of processing functions of various types by using a device in the user's own vicinity.

Further, although the selection of a device that has been additionally added via the third screen is implemented in the first embodiment, the present invention is not limited to such selection. For example, a pre-specified device is set by default for each device item such as a scanner and printer and, instead of selecting a device via the third screen, the device which has been set by default may be used to execute processing. Further, in cases where a plurality of FAX modems are installed in the network 10, when one FAX modem is occupied, sorting control may be performed in order to perform FAX send/receive processing by using another FAX modem.

Furthermore, when there are a plurality of devices which are the same device item are installed, distributed processing of a task may be performed using a plurality of devices. In particular, when distributed processing of a print task is executed when there are a plurality of printers and when distributed processing of a FAX send/receive task is executed when there are a plurality of FAX modems, an improvement in productivity can be expected.

Second Embodiment

An overview of the operation of an MFP system according to the second embodiment will be described next. The second embodiment relates to a data synchronization processing technology when a database is shared between a plurality of units 20. Further, here, a description will be provided by assuming, for example, that unit 20A and unit 20B in the constitution illustrated in FIG. 3 exist in remote locations (Tokyo and Osaka, for example) and a first LAN (the LAN of the head office in Tokyo, for example), which comprises unit 20A, devices 30A, 30B, 30C, 30E, and 30F and a browser terminal 40A, and a second LAN which comprises unit 20B and devices 30D and 30G (the LAN of the Nagano branch office, for example) are connected via a network to form a WAN.

Figure 12:
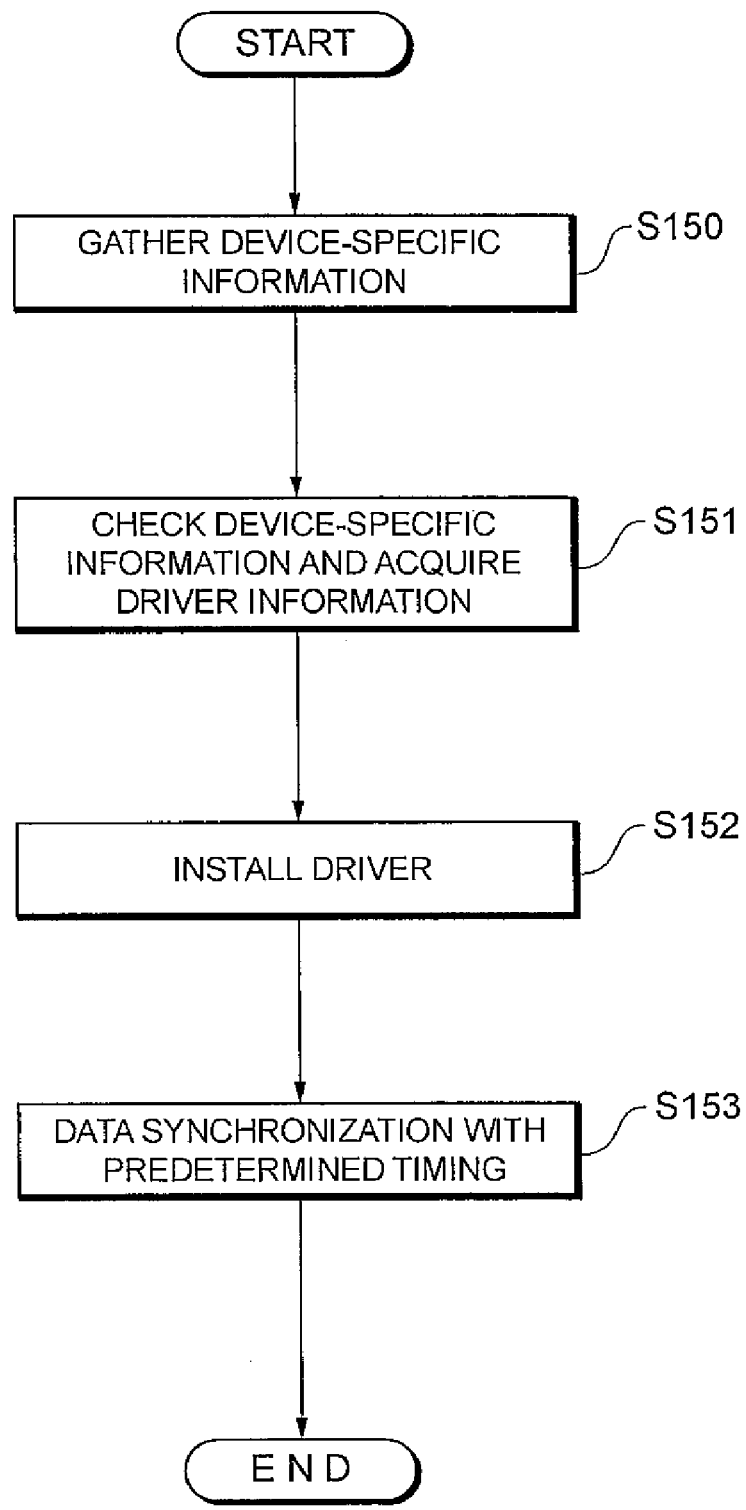
FIG. 12 is a flow chart showing the flow of the data synchronization processing.

FIG. 12 is a flowchart showing the flow of data synchronization processing between a plurality of units 20. Further, 'data synchronization processing' is processing which, when a database that is managed by any unit 20 among the plurality of units 20 is updated, updates the database of another unit 20 with predetermined timing and reflects the updated information in the other unit 20.

First, when a device 30 such as a scanner is newly connected to the network 10 or the like, the unit 20 negotiates with the device 30, collects device-specific information, and stores same in a database (device-specific information table 24) (S150). For example, when the printer 30E is connected to the network 10, negotiation with unit 20A is performed and unit 20A acquires device-specific information from the printer 30E and additionally registers the device-specific information in the database of the unit 20A.

Thereafter, the device-specific information is compared with that of the model information table 25 and information related to the driver required for control of the printer 30E that is newly connected is acquired (S152). The driver-related information stores the link destination where the driver is stored or a driver program, and, therefore, the driver is installed based on this information (S154). Thus, the unit 20A is able to additionally register the device-specific information for the printer 30E connected to the network 10 in the database and install the driver that controls printer 30E in the unit 20A so that the printer 30E can be utilized by the unit 20A.

Thereafter, a plurality of units 20 activate and execute data synchronization processing with predetermined timing (S156). More specifically, mutual communication is carried out between an arbitrary plurality of units 20 that are determined beforehand and, when it is detected that the content of the respective databases does not match, data synchronization processing is performed by sending and receiving the required data. Thereupon, the respective databases may be updated on the basis of the data that has been updated since data synchronization processing was first performed.

In the above example, units 20A and 20B mutually communicate and exchange information with predetermined timing and, when it is judged that device-specific information and driver-related information for printer 30E has been newly registered in unit 20A, unit 20B performs processing to additionally register this information in the its own database.

Further, although the units 20 are able to activate and execute data synchronization processing with optional timing, it is preferable that data synchronization processing be executed when some kind of event occurs with the MFP system 100 and that synchronization between a plurality of databases be performed. In particular, data synchronization processing may be executed when the units 20 are powered up, when the units 20 have recovered from a breakdown, when the occurrence of some kind of failure with the MFP system 100 is detected, when it is detected that a device 30 has been added to or removed from the network 10, or when an instruction to add a device is received from the browser terminal 40.

As detailed hereinabove, in the second embodiment, the constitution is such that a plurality of units 20 collectively manage data related to peripheral devices and execute data synchronization processing with predetermined timing.

Thereupon, in cases where the content of the database is updated through the addition of device-specific information and so forth, that does not mean that the addition and update of objects with respect to the databases of all the units 20 is performed at the same time as the update. Even when the database is changed, processing is initially performed on only one of the units 20. Further, synchronization with the database of another unit 20 is performed with timing that is determined beforehand (when an event occurs, for example) and, in the event of a change, the database is updated by transmitting the information to the other unit 20. In comparison with a method that involves simultaneously updating all of the databases all of the time, such an update method has the advantage that the traffic required for synchronization of the unit 20 is reduced.

In addition, because it is possible to perform an update in parallel for a plurality of databases, depending on the case, a situation where an object that exists on a certain unit 20 cannot be found on another unit 20 can arise. For example, in cases where individual device-specific information is added in parallel at the same time to a plurality of units 20 having separate logical locations on the network, depending on the unit 20 accessed by the browser terminal 40, there is the possibility that data such as additionally registered device-specific information will not be reflected. Just in case, the constitution is preferably such that, upon receiving an instruction for the addition of a device or the like from the browser terminal 40, the units 20 execute data synchronization processing compulsorily in order that the database can be updated to the latest state.

Third Embodiment

Although a case where data synchronization processing between a plurality of units 20 is automatically executed with predetermined timing was described in the second embodiment, data synchronization processing for the whole of the MFP system 100 may be executed on the basis of an instruction from the user. Thereupon, the unit 20 that received the instruction from the user performs data synchronization processing as a result of mutual communication with all of the units 20 connected to the MFP system 100 and updates the database to the latest state.

Thus, even in a case where an event such as failure has not befallen the MFP system 100, because data synchronization processing is activated and executed compulsorily on the basis of a user instruction, the unit 20 is then able to send back the latest data for the whole of the MFP system 100 to the user.

Second Embodiment

The second embodiment will be described next.

Figure 13:
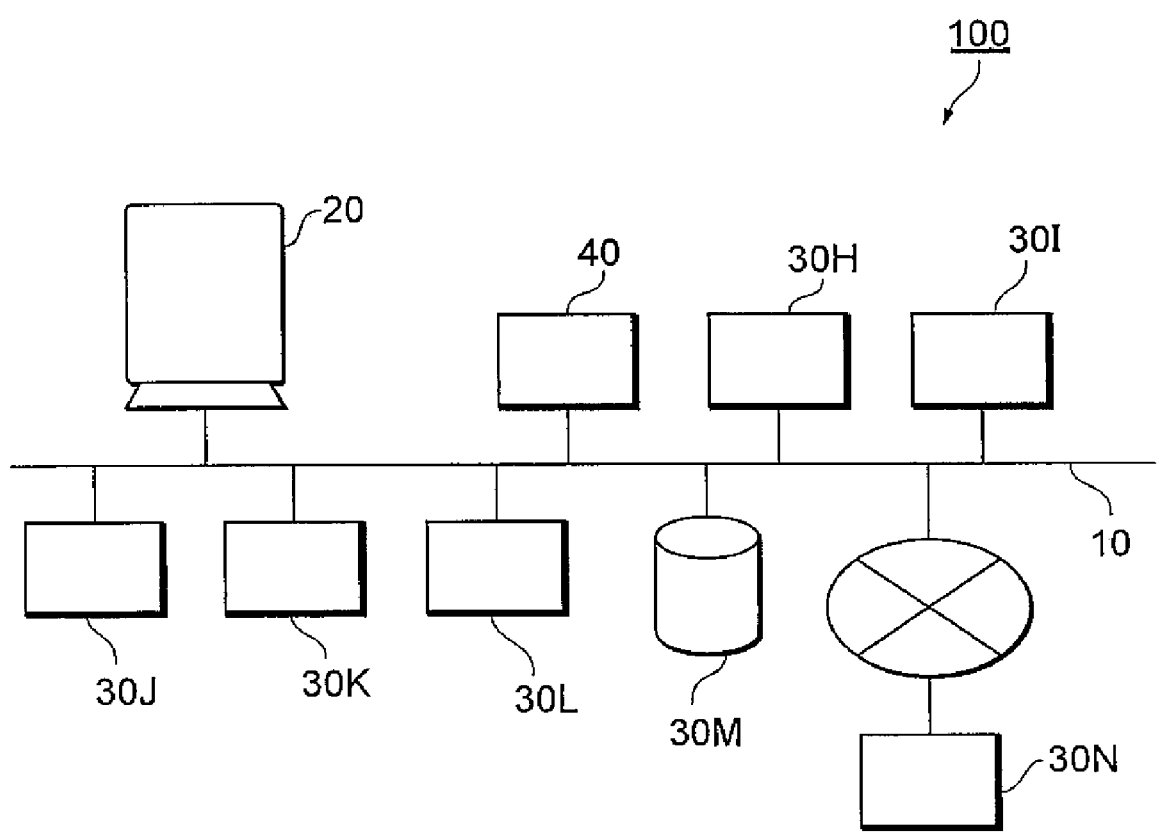
FIG. 13 is a block diagram showing an example of the system constitution of the MFP system 100 according to a second embodiment.

FIG. 13 is a block diagram showing an example of a specific system constitution of the MFP system 100 according to the second embodiment. In the MFP system 100 according to the example shown in FIG. 13, a unit 20, a browser terminal 40, a scanner 30H, a projector 301, an image viewer 30J, a digital whiteboard 30K, a storage device 30M such as a hard disk drive, a server computer 30N, and another device 30L are connected to the network 10.

Here, the user of the unit 20 uses the browser terminal 40 to instruct the unit 20 to perform print processing or the like. Further, a general-purpose scanner comprising image-reading means can be used for the scanner 30H. General-purpose peripheral devices or other peripheral devices can similarly also be used for the projector 301 image viewer 30J, digital whiteboard 30K, storage device 30M such as a hard disk drive, server computer 30N, and other device 30L.

FIG. 14 is an example of a table constitutional view of the device-specific information table 24 of the second embodiment. FIG. 15 is an example of a table constitutional view of the model information table 25 of the second embodiment. The details of the device-specific information table 24 and model information table 25 are the same as those described in the first embodiment and, therefore, a description thereof will be omitted.

An overview of the operation of the MFP system 100 according to the second embodiment will be described next.

First, processing to compare the device-specific information, which is executed when a device 30 is newly connected to the network 10, will be described.

Figure 16:
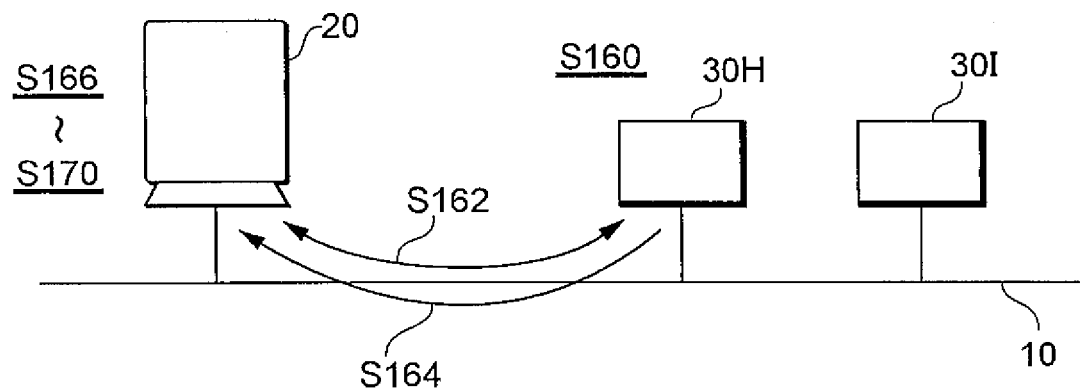
FIG. 16 shows the flow of processing to collect device-specific information.

FIG. 16 shows the flow of the processing to compare the device-specific information of the unit 20. Here, a case where the scanner 30H is newly connected to the network 10 will be described by way of example.

When the scanner 30H is newly connected to the network 10 (S160), the PC module 21 of the unit 20 automatically negotiates with the newly connected scanner 30H (S162), collects device-specific information on the scanner 30H, and additionally registers the device-specific information in the device-specific information table 24 (S164). In this embodiment, information that includes the product name, product serial number, manufacturing date, and version number is collected as the device-specific information. Thus, the unit 20 collects and manages the device-specific information on the scanner 30H that has been newly connected to the network 10.

After collecting the device-specific information, the unit 20 compares the collected device-specific information with the model information that has been registered in the model information table 25 (S166). Here, the unit 20 searches the model information table 25 based on the product name and product serial number among the device-specific information collected from the scanner 30H, and checks whether matching model information has been registered. Information such as the manufacturing date may also be utilized as the duplicate data used in the identification judgment of the comparison processing.

When, as a result of the check, matching model information has been registered, the driver for controlling the scanner 30H is read from the driver information field 63 with the check matching record such that an operational state is assumed (S168). That is, the device driver for controlling newly connected devices is automatically installed by comparing device-specific information with the model information.

On the other hand, as a result of the check, when there is a check mismatch, the unit 20 continues the processing without any execution (S170). Further, for each cycle or when the check yields a mismatch, the unit 20 accesses a predetermined computer that is determined beforehand, confirms whether model information has been added and, when such model information has been newly added, the newly added model information is downloaded and additionally registered in the model information table 25.

The processing for issuing an output instruction from the browser terminal 40 to the unit 20 will be described next.

Figure 17:
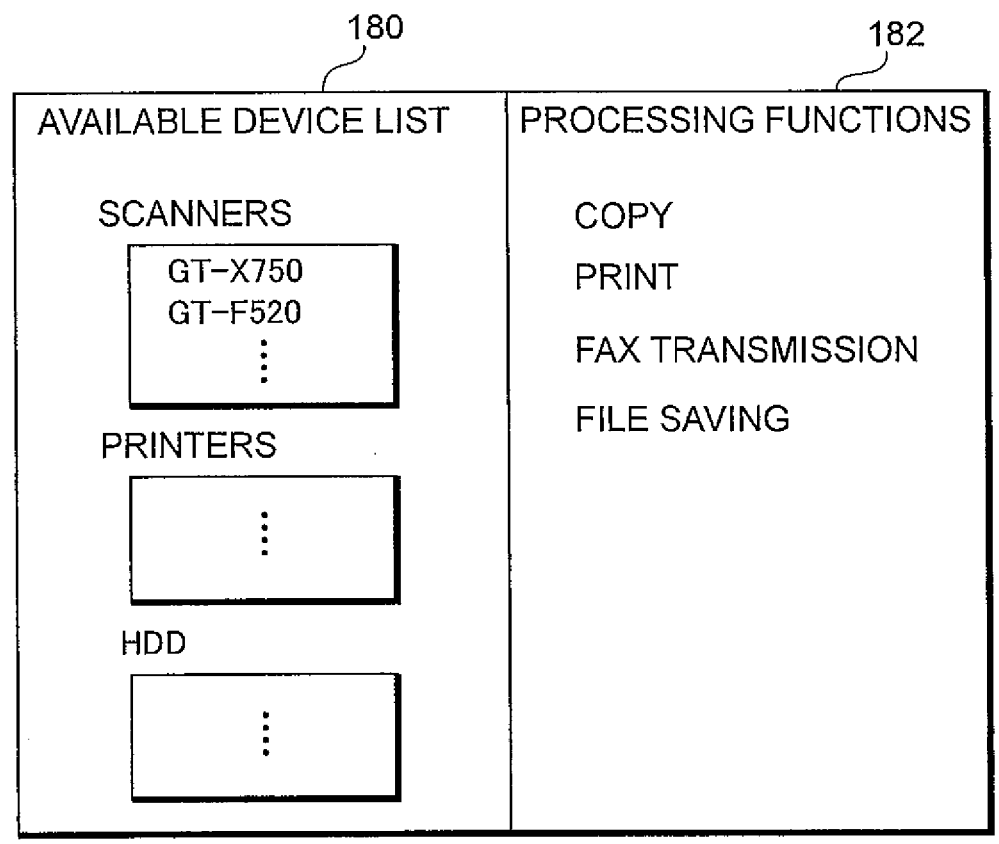
FIG. 17 is an example of a processing instruction screen that is displayed by the browser terminal 40.

FIG. 17 is an example of a processing instruction screen that is displayed on the browser terminal 40. An available device list 180 and a processing function list 182 are displayed on the screen of the browser. Devices for which device-specific information has been registered in the device-specific information table 24 are displayed in the available device list 180. Further, when groups have been registered in the group field 59 of the device-specific information table 24, only those devices pertaining to the groups matching the groups desired by the user are selected and displayed in the form of a list. Further, the processing function list 182 displays a list of processes that can be performed by using the devices displayed in the available device list 180.

Figure 18:
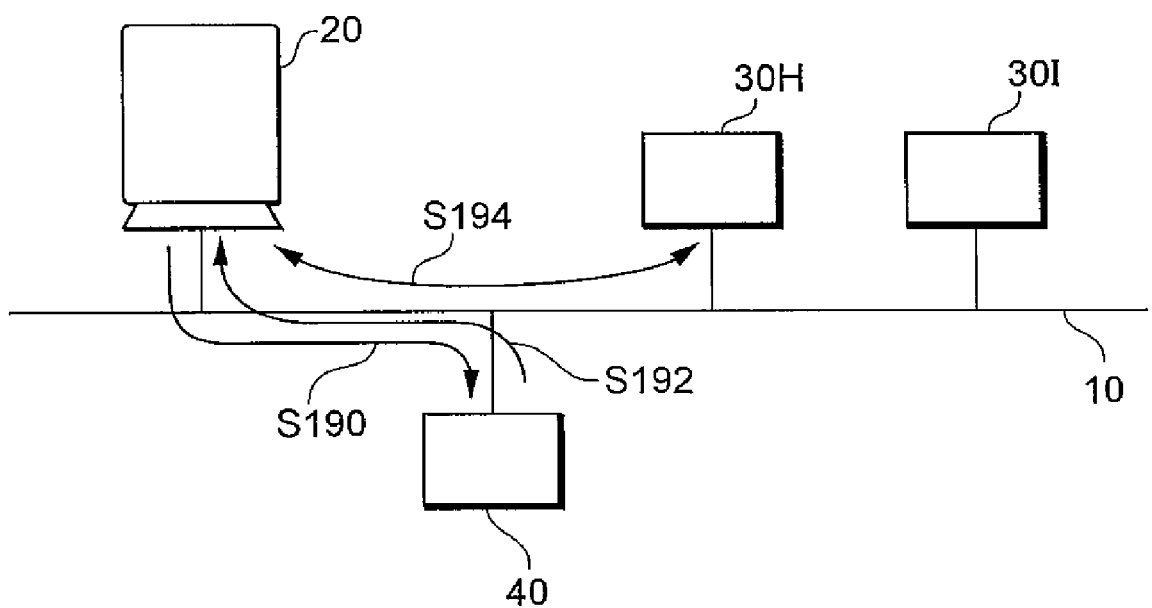
FIG. 18 shows the flow of the processing that issues an output instruction to the unit 20.

FIG. 18 shows the flow of processing to issue an output instruction to the unit 20. Here, processing that uses the image-forming means (printer) of the output module 28 to print and output images that are captured by the scanner 30H.

First, the user accesses the unit 20 via the browser terminal 40. The browser terminal 40 receives the processing instruction screen information distributed by the Web server module 27 and displays the processing instruction screen shown in FIG. 17 on the display means of the browser terminal 40 (S190).

The user first selects the desired processing from among the processing function list 182 of the display screen and then selects the devices for executing this processing from the available device list 180 (S132). At such time, the selection of the processing and device may be executed by using a normal technique such as designating the processing and device by means of a pointing device or touch panel.

For example, if the user selects 'print' from the processing function list 182, the data to be printed and the output destination for executing the printing are then designated. When the print data are captured from the scanner 30H, the scanner 30H is designated from the available device list 180. As a result, the MFP module 22 automatically interprets the fact that print data are captured by performing scanning by means of the scanner 30H. Meanwhile, the image-forming means of the Output module 28 is selected from the available device list 180 as the output destination. When a plurality of printers of the same type are connected, for example, the location of the printer to be used for printing is designated.

Further, when the user selects the desired processing function from the processing function list 182, only the devices associated with the processing function of the available device list 180 can be selected and unassociated devices enter a state that cannot be displayed or selected. For example, when the user selects 'print' from the processing function list 182, output devices that are not related to the print processing such as the projector 301 and the RGB output terminals and so forth are removed from the device list and move into a state in which they cannot be selected. Only input devices such as the scanner 301 and output devices such as the printer are presented as devices that can be selected. Thus, the operability of the user improves as a result of making it possible to select only the devices associated with the processing function selected by the user from the device list.

Thus, when the processing function (work content) and the device for executing the processing are designated, the designated processing is executed by the designated device (S194). More specifically, the PC module 21 of the unit 20 captures print data from the scanner 30H and, images are formed from the print data by the image-forming means of the Output module 28 which are then printed out. If necessary, the MFP module 22 converts data into a format that is compatible with an input device and output device (including the Output module 28), whereupon the data are transmitted from the input device to the output device via the PC module 21 and processing is executed.

The browser terminal 40 is, as a general rule, used only for issuing a processing content instruction. When an instruction regarding the processing content is issued to the unit 20 via the browser terminal 40, data are then automatically exchanged between unit 20 and each device 30 and the processing instructed by the user is executed. Therefore, the browser terminal 40 need not comprise a driver for controlling the respective devices 30 connected to the network 10 or a printer driver or the like but rather is able to execute the desired processing driverlessly.

Further, although processing to print out images captured by means of a scanner by using the unit 20 was exemplified in the second embodiment, various processing that combines optional devices can be executed. For example, in the case of printing out a file that is stored in a storage device connected to the network, after the desired storage device is selected from the available device list 180, the file to be printed out may be designated. Further, an instruction to print a file stored in the storage means of the browser terminal 40 may also be issued.

Further, in this embodiment, the unit 20 may comprise the Output module 28. That is, the unit 20 is constituted containing an output system such as a printer. However, the unit 20 need not necessarily contain an output system (output module 28). In other words, the unit 20 may be constituted comprising only the PC module 21 and the output system such as a printer may be positioned as one of the external devices as per the devices 30 and may be constituted to manage device-specific information on the printer or the like in the device-specific information table 24.

Further, as mentioned earlier, the present invention is not limited to the above embodiments. Rather, the present invention can be implemented in a variety of other forms within a scope not departing from the spirit of the present invention. For this reason, the above embodiment is only a simple illustration in all respects and is not to be interpreted in a restrictive way.

For example, although the present invention was described on the basis of the specific system constitution shown in FIGS. 3 and 13 in the above embodiment, it is understood that the system constitution of the present invention is not limited to such a constitution.

Moreover, the respective processing steps of the above processing can be changed arbitrarily with respect to their order or can be executed in parallel within a range that does not produce inconsistencies in the processing content.

In addition, in the above embodiment, a case where the device-specific information was constituted by the product name, product serial number, manufacturing date, and version number was illustrated. However, the present invention is not limited to such a case. For example, only the product name and product serial number may be employed. The point is that any kind of information may be used as long as this information allows the respective devices 30 on the network 10 to be uniquely identified and this information is held peculiarly by the respective devices 30.

Moreover, according to the present invention, when a plurality of units 20 are connected to the network 10, control is exercised such that the plurality of units 20 co-operates and virtually act as one unit. Hence, irrespective of which unit 20 in the system the browser terminal 40 accesses, a shared UI is provided.

What is claimed is:

1. A multifunction peripheral unit that is connected to a user terminal and a plurality of devices via a network, comprising:

a list transmission section that creates a list of devices connected to the network and transmits the list of devices to the user terminal;

a device information reception section that receives information on a device selected by a user from the user terminal constituting a transmission destination for the list of devices;

a processing function list transmission section that creates a list of processing functions that can be executed by the device on the basis of the received device information and transmits the list of the processing functions to the user terminal;

a processing function information reception section that receives information on a processing function selected by the user from the user terminal constituting the transmission destination for the processing function list;

an execution control section that controls the device to execute the processing function on the basis of the received device information and processing function information;

an additional list transmission section that creates an additional list of devices that are necessary to execute the selected processing function when a different device from the selected device is further needed to execute the selected processing function and transmits the additional list of devices to the user terminal; and an additional device information reception section that receives information on a device additionally selected by the user from the user terminal constituting the transmission destination for the additional list of devices, wherein the execution control section controls the selected device and the additionally selected device to execute the selected processing function on the basis of the device information received by the device information reception section, the processing function information received by the processing function information reception section, and the additional device information received by the additional device information reception section.

2. The multifunction peripheral unit according to claim 1, further comprising a device-specific information storage section that stores device-specific information for identifying devices connected to the network, wherein the list transmission section references information stored in the device-specific information storage section to create the list.

3. The multifunction peripheral unit according to claim 2, further comprising a UI information storage section that stores information related to the processing functions that can be executed by the respective devices connected to the network, wherein the processing function list transmission section references the information stored in the UI information storage section to create the list of the processing functions.

4. The multifunction peripheral unit according to claim 3, further comprising:

a model information storage section that associates and stores device-specific information on devices that can be connected to the network and information relating to drivers for controlling the devices; and a section that, when a device is newly connected to the network, searches the model information storage section based on the device-specific information on the newly connected device and installs a driver for the newly connected device.

5. A multifunction system in which a multifunction peripheral unit, a user terminal, and a plurality of devices are connected to a network, wherein
the multifunction peripheral unit comprises:
a list transmission section that creates a list of devices connected to the network and transmits the list of devices to the user terminal;
a device information reception section that receives information on a device selected by the user from a user terminal constituting a transmission destination for the list of devices;
a processing function list transmission section that, based on the received device information, creates a list of processing functions that can be executed by the device and transmits the list of the processing functions to the user terminal;
a processing function information reception section that receives information on a processing function selected by the user from the user terminal constituting the transmission destination for the processing function list;
an execution control section that controls the device to execute the processing function on the basis of the received device information and processing function information;
an additional list transmission section that creates an additional list of devices that are necessary to execute the selected processing function when a different device from the selected device is further needed to execute the selected processing function and transmits the additional list of devices to the user terminal; and
an additional device information reception section that receives information on a device additionally selected by the user from the user terminal constituting the transmission destination for the additional list of devices, wherein
the user terminal comprises:
a list presentation section that receives the list of devices from the multifunction peripheral unit and presents the list of devices to the user;
a device information transmission section that transmits information on the device selected from the list of devices to the multifunction peripheral unit;
a processing function list presentation section that receives the processing function list from the multifunction peripheral unit and presents the processing function list to the user;
a processing function information transmission section that transmits information on the processing function selected from the processing function list to the multifunction peripheral unit;
an additional list presentation section that receives the additional list of devices from the multifunction peripheral unit and presents the additional list of devices to the user; and
an additional device information transmission section that transmits information on the device additionally selected from the additional list to the multifunction peripheral unit, and
wherein the execution control section controls the selected device and the additionally selected device to execute the selected processing function on the basis of the device information received by the device information reception section, the processing function information received by the processing function information reception section, and the additional device information received by the additional device information reception section.

6. A processing function selection method of allowing a user to select a processing function of a multifunction peripheral unit having a control section that controls the multifunction peripheral unit, the method comprising:
a step in which the control section creates a list of devices connected to a network and transmits the list of devices to a user terminal;
a step in which the control section receives information on a device selected by the user from the user terminal constituting a transmission destination for the list of devices;
a step in which the control section creates a list of processing functions that can be executed by the device based on the received device information and transmits the list of the processing functions to the user terminal;
a step in which the control section receives information on the processing function selected by the user from the user terminal constituting the transmission destination for the processing function list;
a step in which the control section controls the device to execute the processing function on the basis of the received device information and processing function information;
a step in which the control section creates an additional list of devices that are necessary to execute the selected processing function when a different device from the selected device is further needed to execute the selected processing function and transmits the additional list of devices to the user terminal; and
a step in which the control section receives information on a device additionally selected by the user from the user terminal constituting the transmission destination for the additional list of devices,
wherein the control section controls the selected device and the additionally selected device to execute the selected processing function on the basis of the device information, the processing function information and the additional device information which are received by the control section.

* * * * *